United States Patent
Markison

(10) Patent No.: US 10,706,424 B2
(45) Date of Patent: *Jul. 7, 2020

(54) DEVICE INCLUDING IMAGE INCLUDING MULTIPLE LAYERS

(71) Applicant: Visa U.S.A. Inc., San Francisco, CA (US)

(72) Inventor: Timothy Markison, Lahaina, HI (US)

(73) Assignee: Visa U.S.A. Inc., San Francisco, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/389,561

(22) Filed: Apr. 19, 2019

(65) Prior Publication Data

US 2019/0244208 A1 Aug. 8, 2019

Related U.S. Application Data

(60) Continuation of application No. 15/912,236, filed on Mar. 5, 2018, now Pat. No. 10,311,441, which is a (Continued)

(51) Int. Cl.
*G06Q 20/40* (2012.01)
*G06Q 20/10* (2012.01)
(Continued)

(52) U.S. Cl.
CPC ......... *G06Q 20/409* (2013.01); *G06K 9/2063* (2013.01); *G06K 9/228* (2013.01); *G06Q 20/10* (2013.01); *G06Q 20/32* (2013.01); *G06Q 20/3274* (2013.01); *G06Q 20/3278* (2013.01); *G06Q 20/341* (2013.01); *G06Q 20/352* (2013.01); *G06Q 20/3572* (2013.01); *G06Q 30/06* (2013.01); *G06Q 40/12* (2013.12);
(Continued)

(58) Field of Classification Search
CPC ....... H04W 12/06; H04W 28/12; H04W 4/06; H04W 4/18; H04W 4/70; H04W 76/10; H04W 76/15; H04W 84/12; H04W 88/16; G06Q 20/409; G06Q 40/12
See application file for complete search history.

(56) References Cited

U.S. PATENT DOCUMENTS 8,103,249 B2   1/2012 Markison
8,583,173 B2  11/2013 Markison
(Continued)

FOREIGN PATENT DOCUMENTS

| KR | 1020010084889 A | 9/2001 |
| KR | 1020020006182 A | 1/2002 |
| WO | 2008086439 A1  | 7/2008 |

OTHER PUBLICATIONS

International Search Report and Written Opinion, dated Mar. 30, 2010, for PCT Patent Application No. PCT/US2009/054812, 7 pages.

(Continued)

*Primary Examiner* — Diane D Mizrahi
(74) *Attorney, Agent, or Firm* — Kilpatrick Townsend & Stockton LLP

(57) ABSTRACT

A server computer and a mobile device, as well as a method, are disclosed. The mobile device includes an image including a transactional image layer and a master image layer. The mobile device can be used to conduct transactions.

18 Claims, 8 Drawing Sheets

Related U.S. Application Data continuation of application No. 14/838,094, filed on Aug. 27, 2015, now Pat. No. 9,940,624, which is a continuation of application No. 14/050,180, filed on Oct. 9, 2013, now Pat. No. 9,152,959, which is a division of application No. 13/329,106, filed on Dec. 16, 2011, now Pat. No. 8,583,173, which is a continuation of application No. 12/326,873, filed on Dec. 2, 2008, now Pat. No. 8,103,249.

(60) Provisional application No. 61/091,343, filed on Aug. 23, 2008.

(51) Int. Cl.

| | | |
|---|---|---|
| *G06Q 20/32* | (2012.01) | |
| *G06Q 20/34* | (2012.01) | |
| *G06Q 30/06* | (2012.01) | |
| *G07F 7/08* | (2006.01) | |
| *G06Q 40/00* | (2012.01) | |
| *G06K 9/20* | (2006.01) | |
| *G06K 9/22* | (2006.01) | |

(52) U.S. Cl.
CPC .............. *G07F 7/08* (2013.01); *G07F 7/0833* (2013.01); *G07F 7/0846* (2013.01)

(56) References Cited

U.S. PATENT DOCUMENTS

| | | | |
|---|---|---|---|
| 9,940,624 B2* | 4/2018 | Markison | G06Q 20/10 |
| 10,311,441 B2* | 6/2019 | Markison | G06Q 20/10 |
| 2006/0219776 A1 | 10/2006 | Finn | |
| 2007/0288371 A1 | 12/2007 | Johnson | |
| 2008/0040278 A1 | 2/2008 | DeWitt | |
| 2010/0048247 A1* | 2/2010 | Markison | G06Q 20/10 |
| | | | 455/558 |
| 2011/0202465 A1 | 8/2011 | Mashhour | |
| 2012/0011071 A1 | 1/2012 | Pennock et al. | |
| 2012/0159599 A1 | 6/2012 | Szoke et al. | |
| 2012/0190386 A1 | 7/2012 | Anderson | |
| 2012/0232968 A1 | 9/2012 | Calman et al. | |

OTHER PUBLICATIONS

Non-Final Office Action, dated Apr. 14, 2011, for U.S. Appl. No. 12/326,873, 11 pages.

Notice of Allowance dated Sep. 16, 2011 for U.S. Appl. No. 12/326,873, 8 pages.

Non-Final Office Action, dated Aug. 1, 2012, for U.S. Appl. No. 13/329,106, 14 pages.

Notice of Allowance dated Jul. 9, 2013 for U.S. Appl. No. 13/329,106, 6 pages.

\* cited by examiner

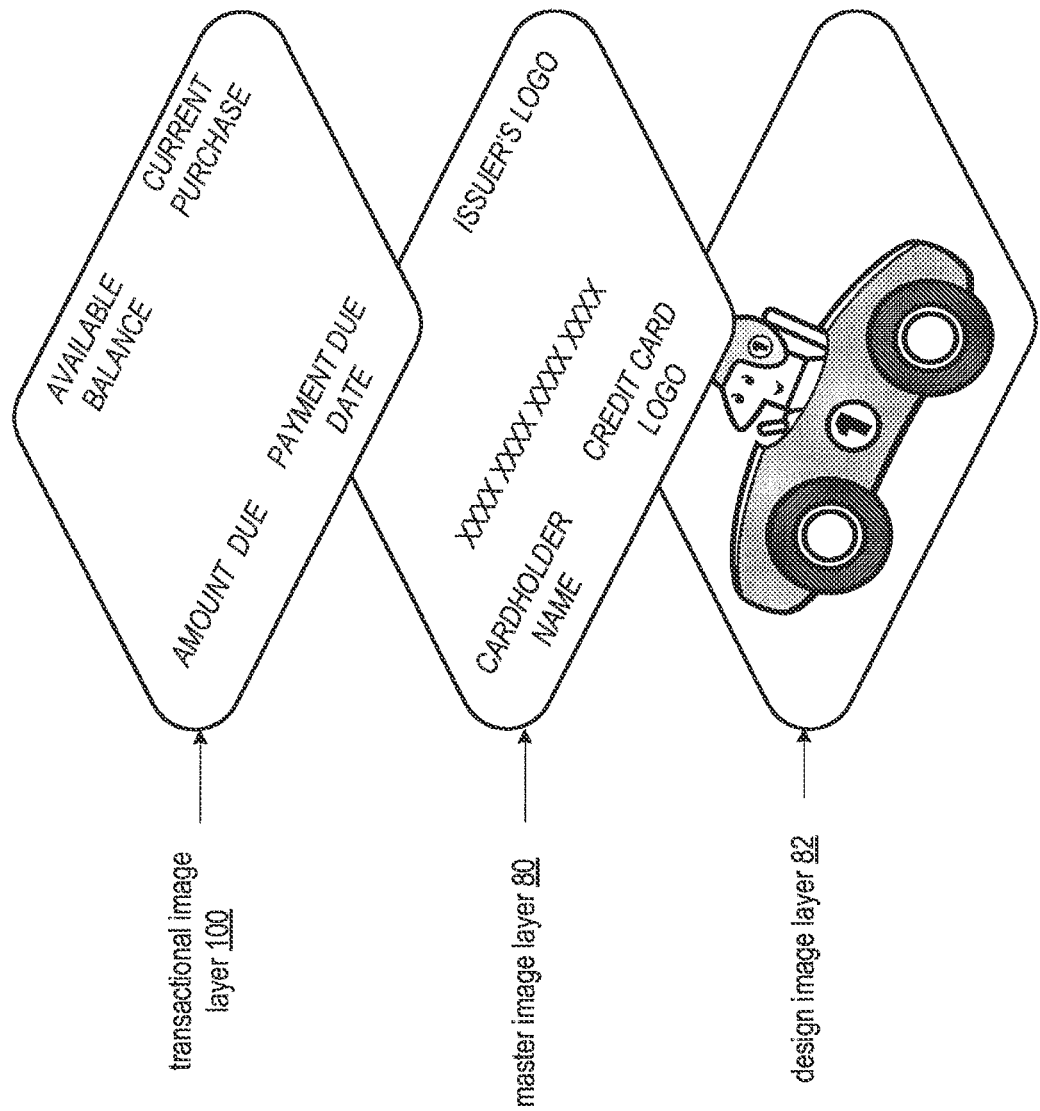

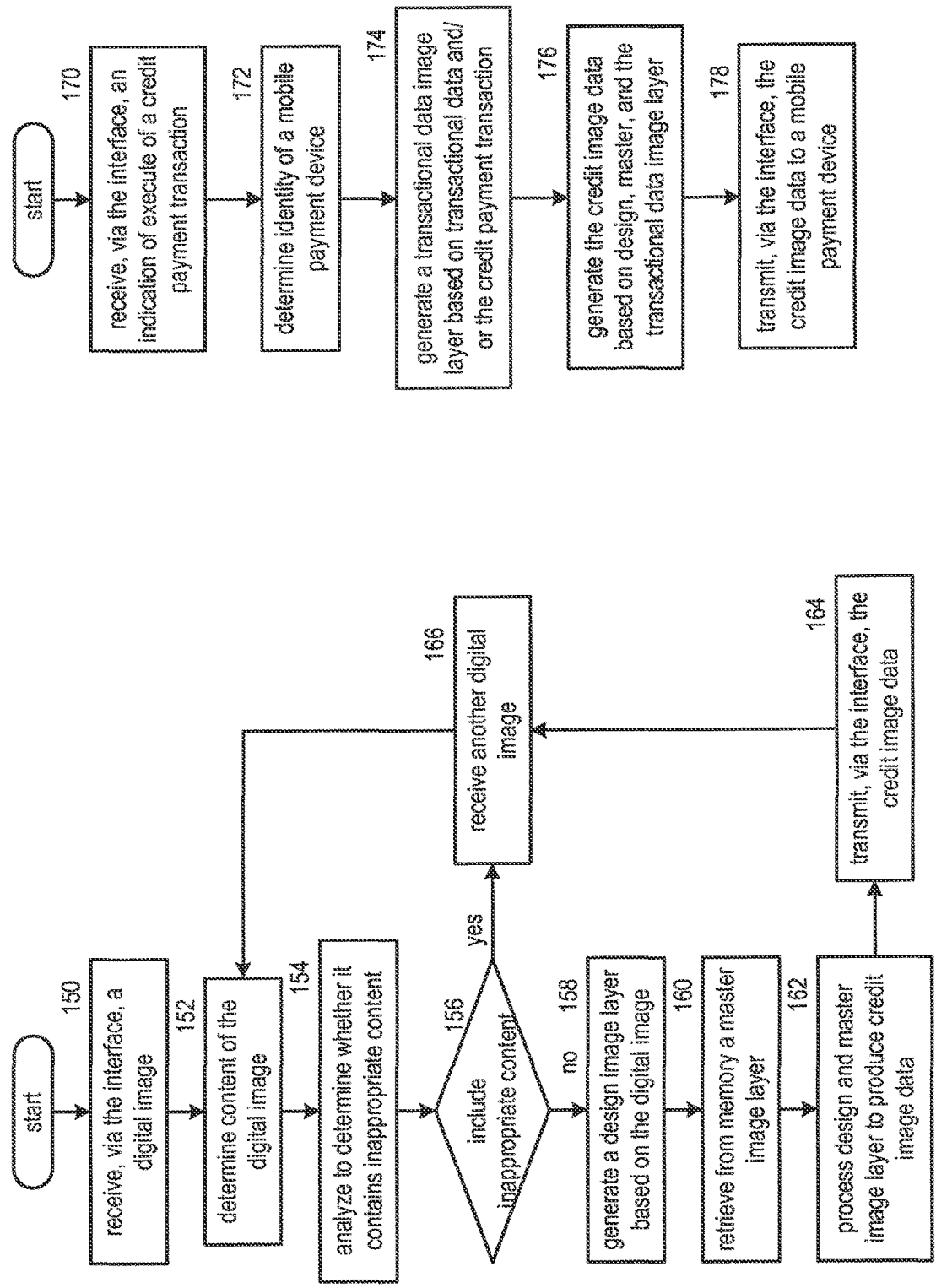

DEVICE INCLUDING IMAGE INCLUDING MULTIPLE LAYERS

CROSS-REFERENCE TO RELATED PATENTS

This application is a continuation application of and claims the benefit of priority of U.S. patent application Ser. No. 15/912,236, filed on Mar. 5, 2018, which is a continuation application of U.S. patent application Ser. No. 14/838,094, filed on Aug. 27, 2015, now U.S. Pat. No. 9,940,624, which is a continuation application of U.S. patent application Ser. No. 14/050,180, filed Oct. 9, 2013, now U.S. Pat. No. 9,152,959, which is a divisional application of U.S. patent application Ser. No. 13/329,106, filed Dec. 16, 2011, now U.S. Pat. No. 8,583,173, which is continuation application of U.S. patent application Ser. No. 12/326,873, filed Dec. 2, 2008, now U.S. Pat. No. 8,103,249, which is a non-provisional of claims the benefit of U.S. Provisional Patent Application No. 61/091,343, filed Aug. 23, 2008, which are herein incorporated by references in their entirety for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to financial transactions and more particularly to credit card imaging.

Description of Related Art

Millions of credit card transactions are accurately processed every day regardless of whether the purchaser is making a purchase using a credit card or mobile payment device in his/her home town, in another part of the world, or via the internet. Each transaction has a two stage process: authorization and clearing & settlement. Authorization is the process of approving or declining the transaction at the commencement of the transaction and clearing & settlement is the process of making the payment and accounting for the payment.

The authorization process begins when a point-of-sale terminal (physical for in-store purchases, virtual for internet purchases) obtains a purchaser's account information from a credit card or mobile payment device information and further obtains a transaction amount. The terminal transmits the account information and the transaction amount to an acquirer bank, which combines the account information and the transaction amount into an authorization request. The acquirer bank transmits the authorization request to a proprietary transaction processing network (e.g., VisaNet®), which routes the authorization request to an issuer bank (i.e., the bank that issued the credit card). Alternatively, the proprietary transaction processing network may perform a stand-in review and authorization.

When the authorization request is sent to the issuer bank, the bank, or a designated third party, reviews the request and approves it or denies it. The issuer bank transmits a response to the proprietary transaction processing network indicating its decision. The proprietary transaction processing network forwards the response to the acquirer bank, which in turn, forwards the response to the point-of-sale terminal.

The clearing & settlement process begins with clearing, which, in turn, begins when the point-of-sale terminal, or other merchant processing device, transmits sales draft information (e.g., account numbers and amounts) to the acquirer bank. The acquirer bank formats the sales draft information into a clearing message that it transmits to the proprietary transaction processing network. The network transmits the clearing message to the issuer bank, which calculates settlement obligations of the issuer bank, processing fees, and the amount due the acquirer bank. Settlement begins when the issuer bank transmits funds to a designated bank of the proprietary transaction processing network, which, after processing, transfers the funds to the acquirer bank.

In an alternate credit card transaction processing system, the proprietary transaction network is owned by a single issuer bank. Thus, in contrast with the previously described system, the alternative system includes only one issue bank, not a large number of issuer banks, and, as such, the issuer bank's functions and the proprietary transaction network functions previously discussed are merged. In this alternate system, the processing of the single issuer is less than the multiple issuer system but creates a processing bottleneck due to the single issuer.

The use of mobile payment devices is gaining momentum in the marketplace and consumers desire more features and ease of use. In addition, many traditional credit card users would like similar additional features that allow them to customize their use of credit cards.

Therefore, a need exists for a credit card imaging and applications thereof.

BRIEF DESCRIPTION OF THE SEVERAL VIEWS OF THE DRAWING(S)

FIG. 5 is a diagram of another example of a credit image in accordance with the present invention;

FIG. 9 is a logic diagram of another embodiment of a method for credit image data processing in accordance with the present invention;

FIG. 10 is a logic diagram of another embodiment of a method for credit image data processing in accordance with the present invention.

DETAILED DESCRIPTION OF THE INVENTION

Figure 1:
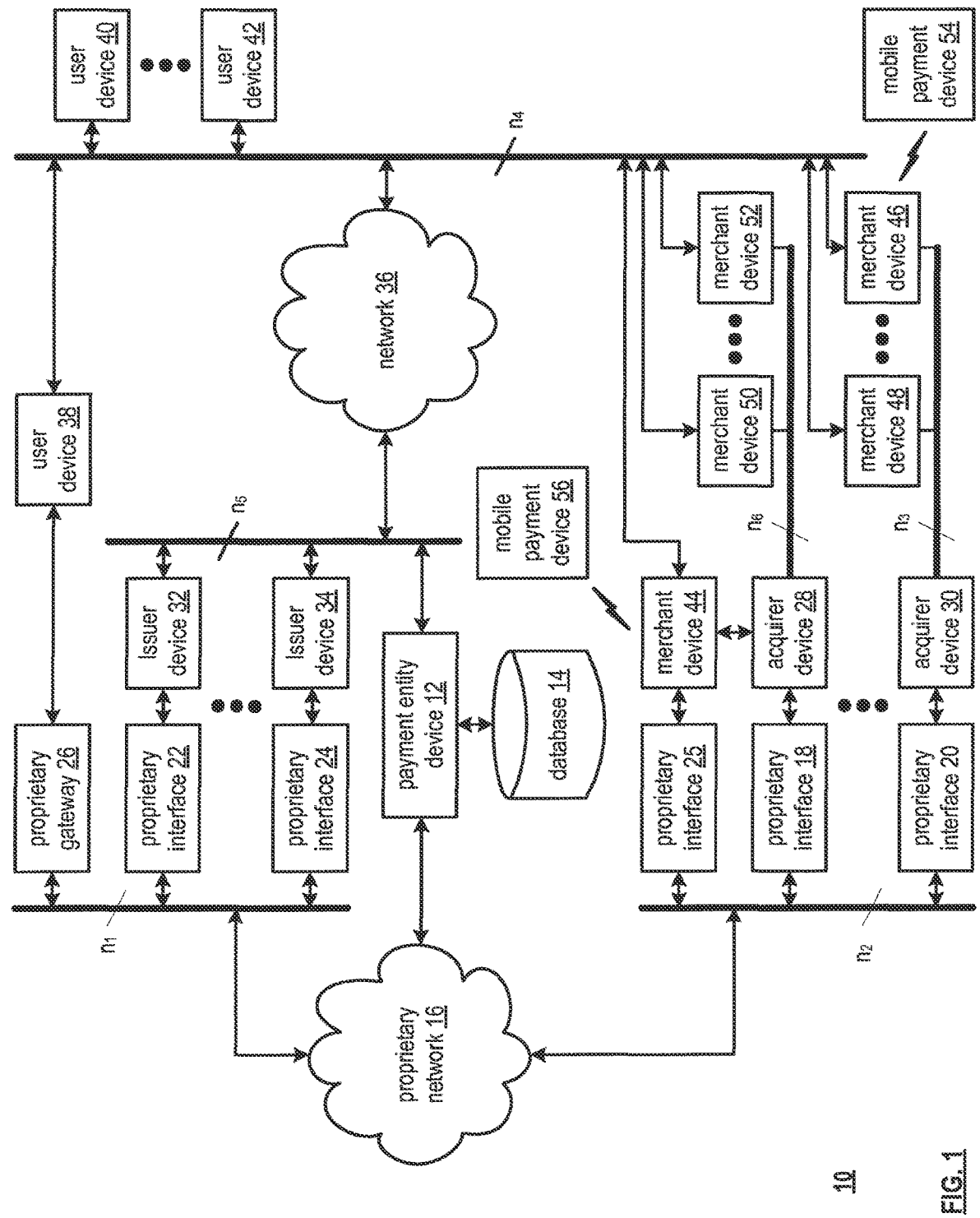
FIG. 1 is a schematic block diagram of an embodiment of a financial transaction network in accordance with the present invention.

FIG. 1 is a schematic block diagram of an embodiment of a financial transaction system 10 that includes a payment entity device 12, a database 14, a proprietary network 16, a plurality of proprietary interfaces 18-25, a proprietary gateway 26, a plurality of acquirer devices 28-30, a plurality of issuer devices 32-34, a public network 36 (e.g., the internet), a plurality of user devices 38-42, an plurality of merchant devices 44-52, and a plurality of mobile payment devices 54-56. The system 10 supports point of sale financial transactions, automatic payment financial transactions, mobile payment device financial transactions, user device public network based financial transactions, and/or any other type of credit account (e.g., credit card, pre-paid card, corporate card, debit card, purchasing card, mobile payment account, etc.) based financial transactions. The system 10 may also support credit account communications (e.g., account balance inquires, usage offers, bonus programs, general credit account information, etc.) via the public network 36. The system 10 may further support proprietary client services (e.g., commercial accounts payable and/or accounts receivable processing, financial reporting, etc.) for a client via its associated user device 38 and the proprietary gateway 26. Note that each of connection lines $n_1$-$n_6$ includes a plurality of individual connection lines for each device connected thereto, but are shown as a bundle for ease of illustration.

As shown, each of the issuer devices 32-34 and acquirer devices 28-30 is connected to the public network 36 and to the proprietary network 16 via a proprietary interface 18-25 to support one or more of the various financial transactions and credit account communications. For instance, a financial transaction may begin with a merchant device 44-52 (e.g., a computer, server, point of sale device, web browser application, and/or any device that facilitates a credit account based transaction) obtaining a credit account information for a point of sale transaction, an internet transaction, a mobile payment transaction, etc. In addition, the merchant device 44-52 determines a corresponding transaction amount and transmits, via a connection line, the credit account information and the transaction amount to an affiliated acquirer device 28-30.

The acquirer device 28-30 (e.g., a computer, server, etc. associated with a financial institution supporting credit account transactions of a merchant) generates an authorization request from the credit account information and the transaction amount. The acquirer device 28-30 transmits the authorization request to the payment entity device 12 via the corresponding proprietary interface 18-20 and the proprietary network 16. The payment entity device 12 accesses the associated database 14 to identify the user associated with the credit account information, an issuer, etc. Having identified the issuer, the payment entity device 12 transmits the authorization request to the appropriate issuer device 32-34 via the proprietary network 16 and the corresponding proprietary interface 22-24.

In an embodiment, the payment entity device 12, the database 14, and the proprietary network 16 may be operated and maintained by a single entity to facilitate seamless authorization and clearing & settlement. For example, Visa, Inc. may provide its VisaNet® as the proprietary network 16 and have one or more computing devices (e.g., computers, servers, super computers, main frames, etc.) coupled to the proprietary network 16 to function as the payment entity device 12, and may have one or more databases 14 coupled thereto. Further, the proprietary interfaces 18-25, which may be proprietary nodes, modems, bridges, etc., serve as secure connection points to the proprietary network 16 to ensure that only authorized devices (e.g., merchant device 44, issuer device 32-34, acquirer device 28-30) have access to the proprietary network 16.

The issuer device 32-34 (e.g., a computer, server, etc. and corresponding financial transaction software associated with a financial institution that issues credit accounts to users) processes the authorization request to determine whether to approve or deny the request. The issuer device 32-34 transmits, via the associated proprietary interface 22-24 and the proprietary network 16, an approval or denial response to the payment entity device 12. The payment entity device 12 forwards the response to the acquirer device 28-30 via the proprietary network 16 and the corresponding proprietary interface 18-20. The acquirer device 28-30 forwards the response to the merchant device 44-52 via the corresponding connection line. Note that the system 10 also supports the clearing & settlement process.

The issuer devices 32-34, the acquirer devices 28-30, and/or the payment entity device 12 support credit account communications from users via the user devices 38-42 and the public network 36, from merchants via the merchant devices 44-52 and the public network 36, etc. For example, a user device 38-42 may access a web site running on the payment entity device 12 (e.g., Visa, Inc.'s web site) to obtain information regarding various credit card offers supported by Visa, Inc. As another example, a user device 38-42 may access an issuer device 32-34 via the public network 36 to obtain current information regarding the user's account with the issuer, on-line bill payment, open a new account, etc.

In addition to accessing the payment entity device 12 via the public network 36, a user device 38 may have access to a proprietary gateway 26 to access the payment entity device 12 via the proprietary network 16 for a proprietary service (e.g., accounts payable, accounts receivable, financial reporting, elite class offers, etc.). Note that the proprietary gateway 26 may be a proprietary node, modem, bridge, etc., that serves as a public connection point to the proprietary network 16. The proprietary gateway 26 functions to ensure that only authorized entities (e.g., user device 38) have access to the proprietary network 16.

As mentioned, the system 10 may support mobile payment transactions initiated by a mobile payment device 54-56. During the processing of a credit payment transaction initiated by the mobile payment device 54-56, the mobile payment device 54-56 may obtain a credit image data and display it. The credit image data may be retrieved from memory, from a financial institution server (e.g., the payment entity device 12, an issuer device 32-34, or an acquirer device 28-30), from a contactless payment module, from a corresponding user device 38-42. etc. The processing, determining, generating, retrieving, and/or displaying of credit image data will be described in greater detail with reference to FIGS. 2-11.

Figure 2:
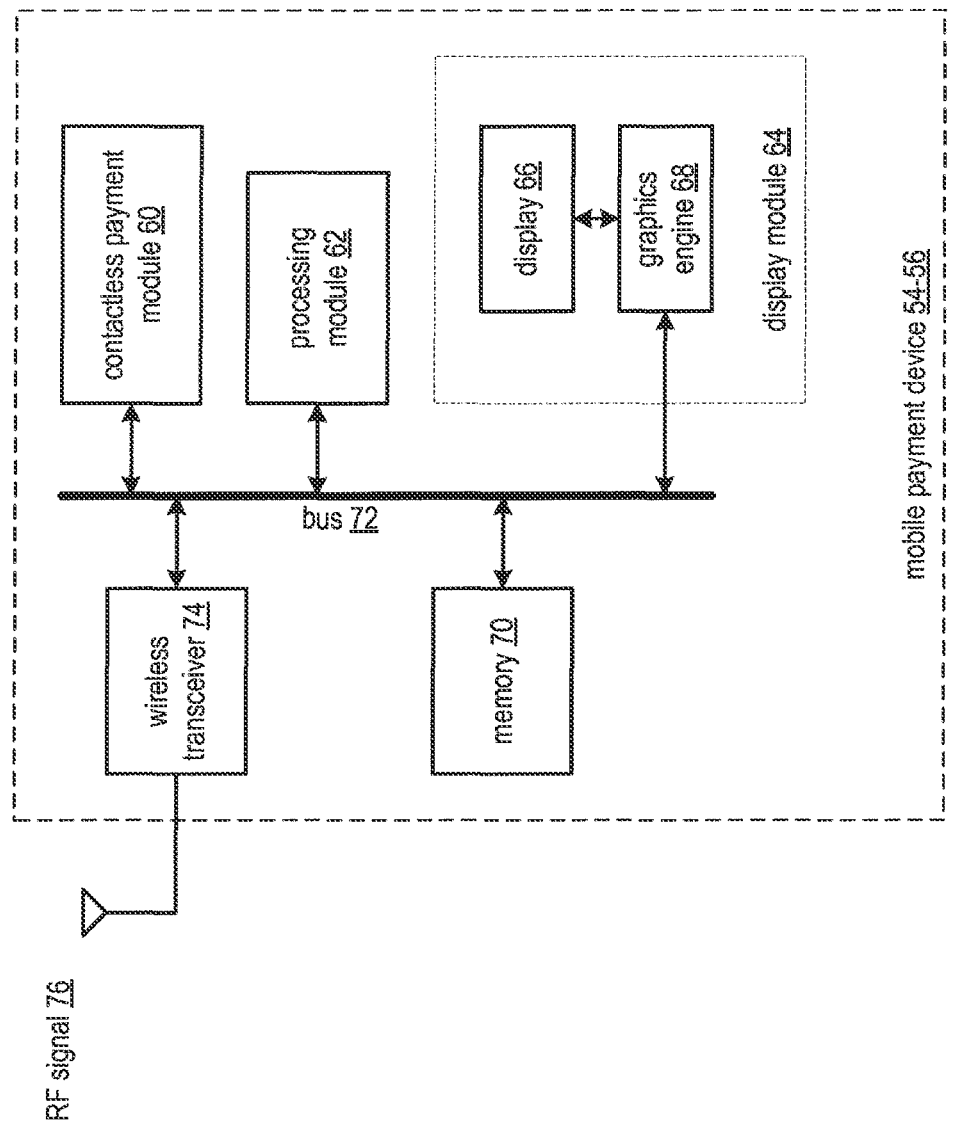
FIG. 2 is a schematic block diagram of an embodiment of a mobile payment device in accordance with the present invention.

FIG. 2 is a schematic block diagram of an embodiment of a mobile payment device 54-56 that includes a contact less payment module 60, a processing module 62, a display module 64, and a bus 72. The display module 64 may include a display 64 (e.g., an LCD (liquid crystal display) display, a DLP (digital light projection) display, etc.) The processing module 62 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 72 may have an associated memory 70 and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 62 implements one or more of its functions via a state machine, analog circuitry, digital circuitry, and/or logic circuitry, the memory 70 and/or memory element storing the corresponding operational instructions may be embedded within, or external to, the circuitry comprising the state machine, analog circuitry, digital circuitry, and/or logic circuitry. Further note that, the memory element stores, and the processing module 62 executes, hard coded and/or operational instructions corresponding to at least some of the steps and/or functions illustrated in FIGS. 2-11. Even further note that the mobile payment device 54-56 may include a wireless transceiver 74 that provides cellular (e.g., voice) and data (e.g., email, Internet access, etc.) telephone functionality for the mobile payment device 54-56.

In operation, the contactless payment module 60 executes a credit payment transaction. In general, when the contactless payment module 60 is proximal to a point of sale terminal (e.g., for point of sale transactions), the contactless payment module 60 exchanges data (e.g., account information, purchase price, etc.) with the point of sale terminal via radio frequency (RF) signals and/or electromagnetic coupling signals. For example, the contactless payment module may be a subscriber identity module (SIM) having a radio frequency identification (RFID) interface; a smart card with the RFID interface; a SIM having a near field communication (NFC) interface; and/or a smart card with the NFC interface. In addition to point of sale transactions, the contactless payment module 60 may provide a remote-based transactions (e.g., internet or Short-Message-Service (SMS) based e-commerce transactions) payment method and/or money transfers between mobile payment devices.

The processing module 60 is coupled to detect the executing of the credit payment transaction. For example, the processing module 60 detects the data exchange between the contactless payment module 60 and the point of sale terminal and/or receives a signal from the contactless payment module 60 indicating initiation of the credit payment transaction. After detecting the executing, the processing module 62 retrieves credit image data. The processing module 62 may retrieve the credit image data from memory 70 and/or from the contactless payment module 60. Alternatively, or in addition to, the processing module 62 may retrieve the credit image data from a financial institution server (e.g., the payment entity device 12, an issuer device 32-34, or an acquirer device 28-30) via the wireless transceiver 74.

As an example of retrieving the credit image data at least partially from a financial institution server, the processing module 62 sends a retrieval message to the wireless transceiver 74 upon detecting the execution of the credit payment transaction. The wireless transceiver 74 converts the retrieval message into an RF signal that is transmitted to a cellular tower (not shown), which converts the RF signal into a data message that is forwarded to the financial institution server via the public network 36. The financial institution server processes the retrieval message to identify the user, the user's credit image data and any other pertinent data. The financial institution sends the user's credit image data to the wireless transceiver 74 via the reverse path from which it received the request message. The wireless transceiver 74 recovers the credit image data from the received RF signal to produce recovered credit image data and provides the recovered credit image data to the processing module 62.

The processing module 62 coordinates the credit image data being provided to the display module 64. The graphics engine 68 (which may be a video graphics accelerator, a video decoder, an LCD driver, a DLP driver, etc.) processes the credit image data to produce a displayed credit image that is displayed via the display 66.

Figure 3:
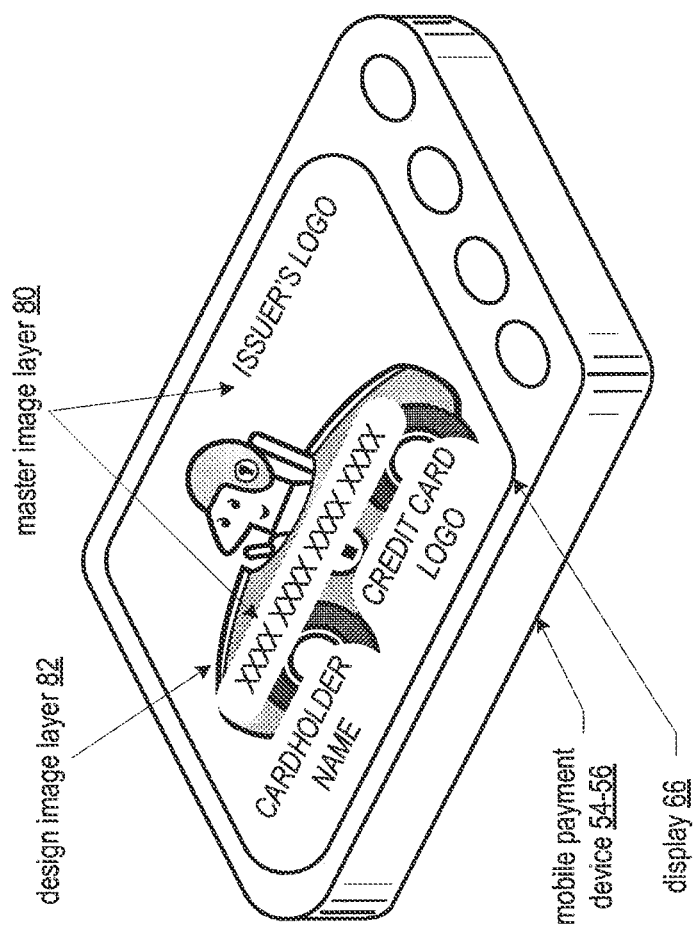
FIG. 3 is a diagram of an example of a credit image displayed on a mobile payment device in accordance with the present invention.

FIG. 3 is a diagram of an example of a credit image displayed on the display 66 of a mobile payment device 54-56. In this example, the credit image data a master image layer 80 (e.g., issuer's logo, credit card logo, cardholder's name, account number, expiration date, issuance date, etc.) and a design image layer 82 (e.g., a race car character). The design layer 82 may be a custom design image layer (e.g., a digital image provided by the user of the mobile payment device 54-56) and/or one of a plurality of approved design image layers offered by the financial institution that operates the financial institution server.

Figure 4:
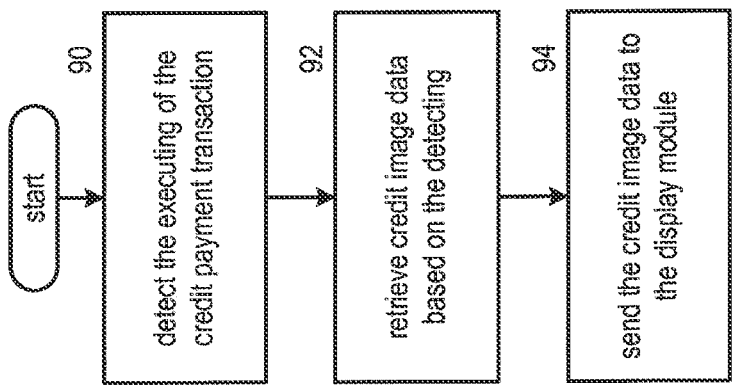
FIG. 4 is a logic diagram of an embodiment of a method for credit image data processing in accordance with the present invention.

FIG. 4 is a logic diagram of an embodiment of a method for credit image data processing that may be performed by the processing module 62. The method begins at step 90 where the processing module 62 detects the executing of the credit payment transaction by the contactless payment module 60. In addition to detecting the executing of the payment transaction, the processing module 62 may detect a type of the credit payment transaction (e.g., credit card, debit card, commercial purchase card, pre-pay card, corporate card, etc.).

The method then proceeds to step 92 where the processing module 62 retrieves the credit image data based on the detecting of the executing of the credit payment transaction. The processing module 62 may retrieve the credit image data in a variety of ways. For example, the processing module 62 may retrieve the credit image data from the memory 70, which stores the credit image data and may further store a plurality of credit image data. If the memory 70 is storing a plurality of credit image data, then the processing module 62 may retrieve one of a plurality of credit image data based on the type to provide the credit card image or in accordance with a retrieval scheme (e.g., round robin, random, user's ordering, etc.). Alternatively, or in addition to, the processing module 62 may retrieve the credit image data from a financial server via the wireless transceiver 74. As yet another alternative, the processing module 62 may retrieve the credit image data from the contactless payment module 60.

The method then proceeds to step 94 where the processing module 62 sends the credit image data to the display module

64. The display module 64 processes the credit image data to render on image on the display 66.

FIG. 5 is a diagram of another example of credit image data that includes the master image layer 80, the design image layer 82, and may further include a transactional image layer 100. The transactional image layer 100 includes data relating to the current purchase (e.g., purchase amount, available balance, etc.) and other relevant data regarding the account (e.g., next payment due date, amount due, recent purchases, etc.).

The processing module 62 may receive the transactional image layer 100 from the financial institution via the wireless transceiver 74. For instance, in response to the request message sent via the wireless transceiver, the wireless transceiver receives a radio frequency (RF) signal from a financial institution server, wherein the RF signal includes the transactional data. The wireless transceiver 74 recovers the transactional data from the RF signal to produce recovered transactional data and provides the recovered transactional data to the processing module 62. The processing module 62 generates the transactional image layer 100 of the credit image data based on the recovered transactional data.

In an embodiment, the processing module 62 may process the master image layer 80 and the transactional image layer 100 such that display 66 alternates presenting the master image and the transactional image. Alternatively, the processing module 62 may process a request from the user to display one or the other of the master image and the transactional image, to jump between the two, or to not display one or more of the image layers.

Figure 6:
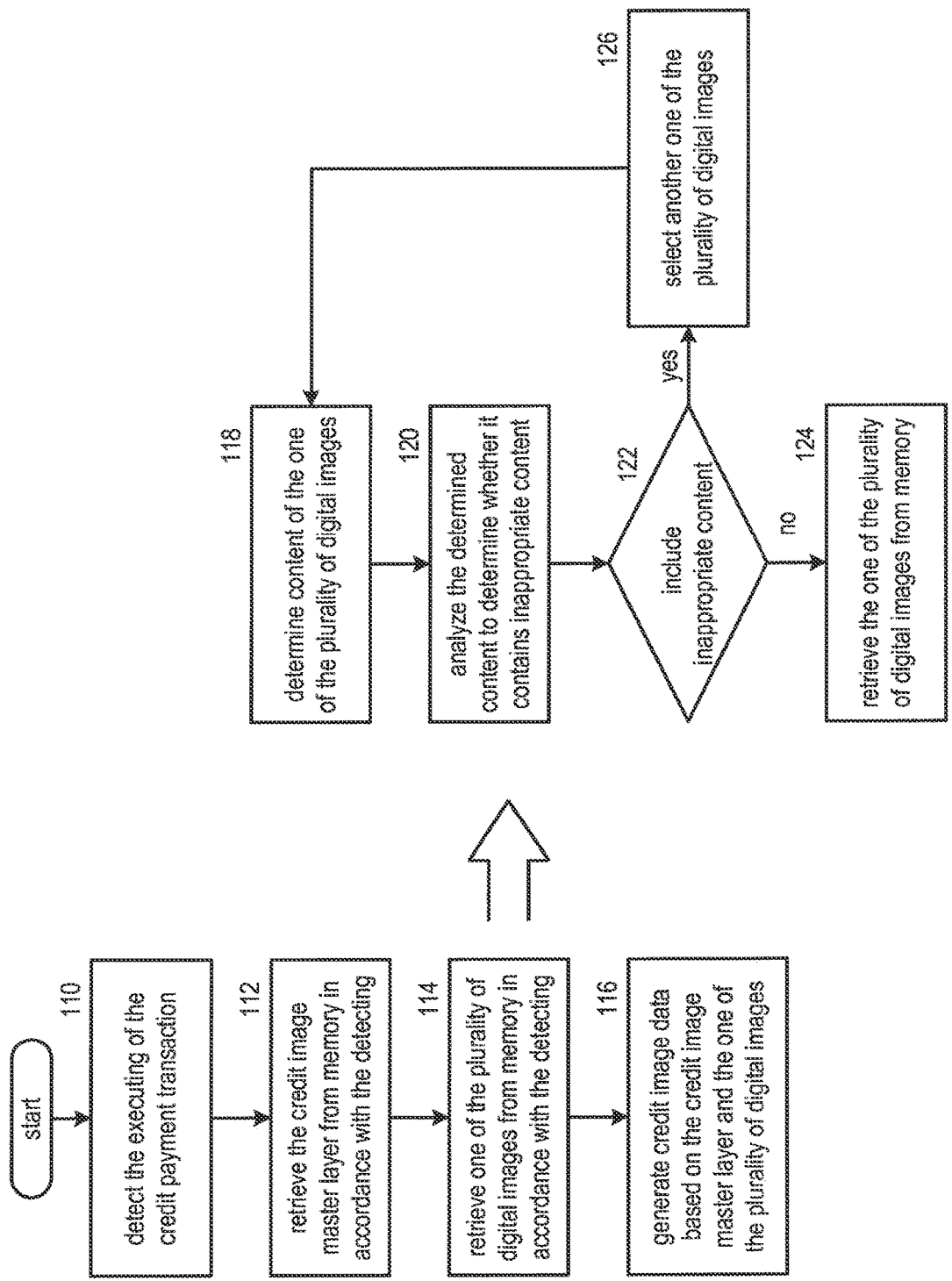
FIG. 6 is a logic diagram of another embodiment of a method for credit image data processing in accordance with the present invention.

FIG. 6 is a logic diagram of another embodiment of a method for credit image data processing that may be performed by the processing module 62. The method begins at step 110 where the processing module 62 detects the executing of the credit payment transaction as previously discussed. The method continues at step 112 where the processing module 62 retrieves the credit image master layer from memory in accordance with the detecting. For instance, as soon as the processing module detects the executing, it begins the retrieval process. Note that the processing module 62 may retrieve the master image layer from memory 70, from a financial institution server via the wireless transceiver 74, and/or from the contactless payment module 60.

The method then proceeds to step 114 where the processing module 62 retrieves one of the plurality of digital images from memory 70 in accordance with the detecting. The retrieval may further be done in accordance with a retrieval scheme. Note that the mobile payment device 54-56 may be a cellular telephone with a built-in digital camera such that the digital images stored in memory 70 are a collection of pictures taken by an operator of the device 54-56. As part of the retrieval process, the processing module 62 may perform an appropriateness check of the image before providing it to the display module 64.

Such a check begins at step 118 where the processing module 62 determines content of the digital image. The method continues at step 120 where the processing module 62 analyzes the content of the image to determine whether it contains inappropriate content. For example, the processing module 62 may perform an image recognition algorithm to identify potentially inappropriate objects within the image. If, at step 122, the image does not include inappropriate content, the method continues at step 124 where the processing module retrieves the digital image from memory and provides it to the display module 64. If, however, the image potentially includes inappropriate content, the method proceeds to step 126 where the processing module selections another digital image for appropriateness checking.

The method then proceeds to step 116 where the processing module 62 generates credit image data based on the credit image master layer and the one of the plurality of digital images. The processing module 62 may further process a transactional image layer into the credit image data, wherein the transactional image layer is based on recovered transactional data.

Figure 7:
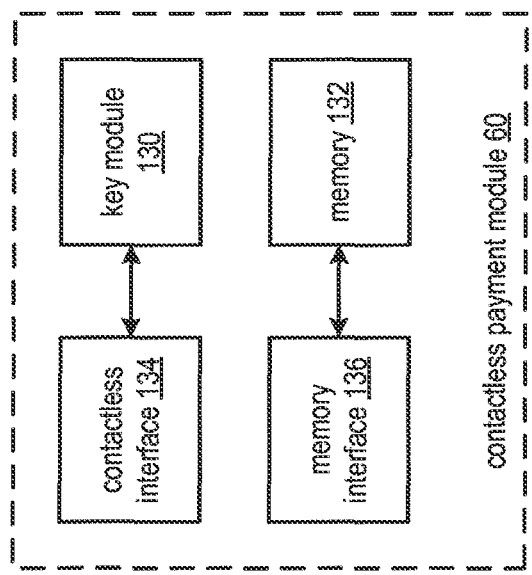
FIG. 7 is a schematic block diagram of an embodiment of a contactless payment module in accordance with the present invention.

FIG. 7 is a schematic block diagram of an embodiment of a contactless payment module 60 that includes a key module 130, memory 132, a contactless interface 134, and a memory interface 136. The key module 130 contains a unique subscriber identification code and credit transactional information in accordance with a mobile payment protocol. In an embodiment, the unique subscriber identification code may be an International Mobile Subscriber Identity (IMSI). The contactless interface 134 transmits at least one of the unique subscriber identification code and the credit transactional information during execution of a credit transaction. In an embodiment, the contactless interface a radio frequency identification (RFID) interface and/or a near field communication (NFC) interface.

The memory 132, which may be memory as previously defined, stores a credit image data that may be retrieved via the memory interface 136 by the processing module 62 or other device, module, etc. The credit image data includes a master image layer and a design image layer, which may be a custom design image layer and/or one of a plurality of approved design image layers.

Figure 8:
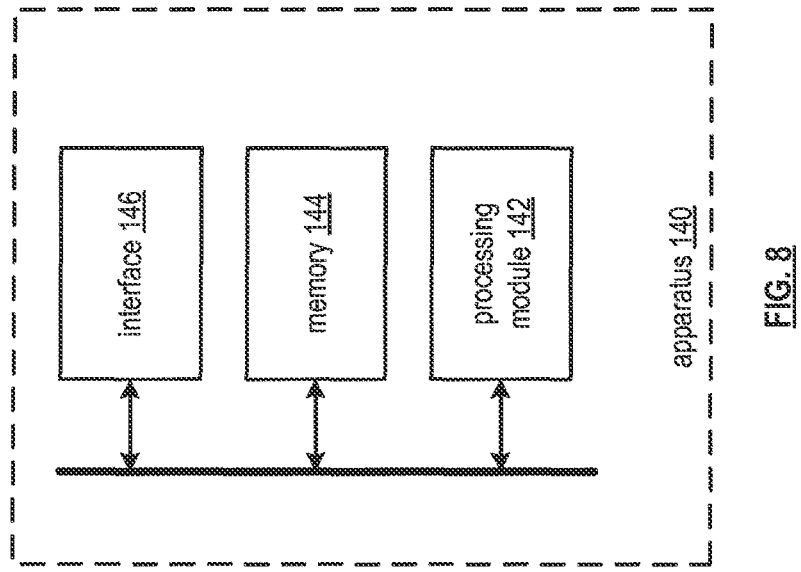
FIG. 8 is a schematic block diagram of an embodiment of a financial transaction apparatus in accordance with the present invention.

FIG. 8 is a schematic block diagram of an embodiment of a financial transaction apparatus 140, which may be included within, or associated with, the payment entity device 12, an issuer device 32-34, and/or an acquirer device 28-30. The apparatus 140 includes a processing module 142, memory 144, and an interface 146, which may be a wireless and/or a wired interface that enables the apparatus 140 to access the public network 36. The processing module 142 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 142 may have an associated memory 144 and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 142 implements one or more of its functions via a state machine, analog circuitry, digital circuitry, and/or logic circuitry, the memory 144 and/or memory element storing the corresponding operational instructions may be embedded within, or external to, the circuitry comprising the state machine, analog circuitry, digital circuitry, and/or logic circuitry. Further note that, the memory element stores, and the processing module 142 executes, hard coded and/or operational instructions corresponding to at least some of the steps and/or functions illustrated in FIGS. 9-11.

FIG. 9 is a logic diagram of another embodiment of a method for credit image data processing that may be processed by the processing module 142. The method begins at step 150 where the processing module 142 receives, via the interface 146, a digital image from a user via a user device 38-42 and/or via a mobile payment device 54-56. The method then proceeds to step 152 where the processing module 142 determines content of the digital image. The method continues at step 154 where the processing module 142 analyzes the content of the digital image to determine whether it contains inappropriate content. This may be done use image recognition software to identify potentially inappropriate objects, gestures, etc. within the digital image.

If the digital image does not include inappropriate content, the method branches from step 156 to step 158 where the processing module 142 generates a design image layer based on the digital image. The method continues at step 160 where the processing module retrieves from memory 144 a master image layer. The method continues at step 162 where the processing module 142 processes the design image layer and the master image layer to produce credit image data. The method continues at step 164 where the processing module 142 transmits, via the interface 146, the credit image data.

If the digital image does include inappropriate content, the method branches from step 156 to step 166 where the processing module 142 rejects the present digital image and begins processing another if one is available.

FIG. 10 is a logic diagram of another embodiment of a method for credit image data processing that begins at step 170 where the processing module 142 receives, via the interface 146, an indication of execute of a credit payment transaction by a mobile payment device. The method continues at step 172 where the processing module 142 determines identity of a mobile payment device based on the indication. The method continues at step 174 where the processing module 142 generates a transactional data image layer based on at least one of transactional data of the mobile payment device and the credit payment transaction. The method continues at step 176 where the processing module 142 generates the credit image data based on the design image layer, the master image layer, and the transactional data image layer. The method continues at step 178 where the processing module 142 transmits, via the interface 146, the credit image data to the mobile payment device.

Figure 11:
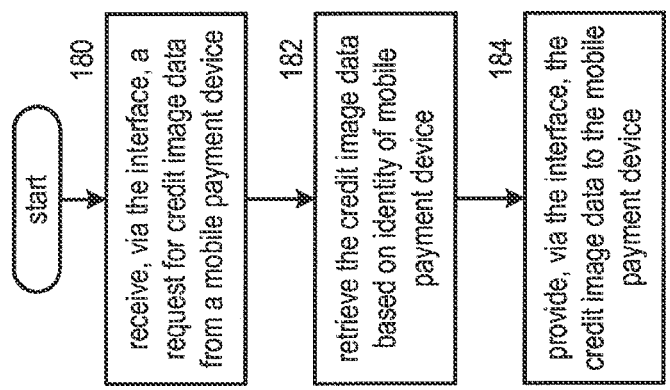
FIG. 11 is a logic diagram of another embodiment of a method for credit image data processing in accordance with the present invention.

FIG. 11 is a logic diagram of another embodiment of a method for credit image data processing that begins at step 180 where the processing module 142 receives, via the interface 146, a request for credit image data from a mobile payment device. The method continues at step 182 where the processing module 142 retrieves the credit image data based on identity of mobile payment device. The method continues at step 184 where the processing module 142 provides, via the interface 142, the credit image data to the mobile payment device. The credit image data may include a master image layer and a design image layer, which may be a custom design image layer and/or one of a plurality of approved design image layers.

In addition to steps 180-184, the processing module 142 may further function to: receive, via the interface 146, an indication of execute of a credit payment transaction from the mobile payment device; generate a transactional data image layer based on at least one of transactional data of the mobile payment device and the credit payment transaction; and generate the credit image data based on the design image layer, the master image layer, and the transactional data image layer.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprising:
   receiving, by a server computer from a mobile device via a communications network, a retrieval message including an identifier associated with the mobile device, in response to an initiation of a transaction using the mobile device;

retrieving, by the server computer, a transactional image layer from a memory based on the identifier associated with the mobile device; and transmitting, by the server computer, the transactional image layer to the mobile device, which causes the mobile device to display image data including the transactional image layer and a master image layer via a display of the mobile device.

2. The method of claim 1, wherein the transactional image layer includes at least one of transactional data associated with the mobile device and transactional data for the transaction.

3. The method of claim 1, wherein the mobile device is a mobile phone.

4. The method of claim 1, wherein the transactional image layer comprises an available balance associated with the identifier for the mobile device.

5. The method of claim 1, wherein a wireless transceiver of the mobile device converts the retrieval message to an radio-frequency signal prior to sending the retrieval message to the server computer.

6. The method of claim 1, wherein the communications network is a wireless communications network.

7. The method of claim 1, wherein the transactional image layer comprises data relating to a current purchase.

8. The method of claim 1, further comprising:
retrieving the master image layer from the memory based on the identifier associated with the mobile device,
processing the master image layer and the transactional image layer to generate the image data, and
transmitting the image data to the mobile device.

9. The method of claim 1, wherein the master image layer is retrieved from the memory in the mobile device.

10. The method of claim 1, wherein the master image layer is retrieved from the memory in the mobile device, and a processor in the mobile device generates the image data.

11. A server computer comprising:
a processor; and
a non-transitory computer-readable storage medium coupled to the processor, comprising code executable by the processor for implementing a method comprising:
receiving, from a mobile device via a communications network, a retrieval message including an identifier associated with the mobile device, in response to an initiation of a transaction using the mobile device;
retrieving a transactional image layer from a memory based on the identifier associated with the mobile device; and
transmitting the transactional image layer to the mobile device, which causes the mobile device to display image data including the transactional image layer and a master image layer via a display of the mobile device.

12. The server computer of claim 11, wherein the transactional image layer includes at least one of transactional data associated with the mobile device and transactional data for the transaction.

13. The server computer of claim 11, wherein the mobile device is a mobile phone.

14. The server computer of claim 11, wherein the transactional image layer comprises an available balance associated with the identifier for the mobile device.

15. The server computer of claim 11, wherein the server computer is remotely located with respect to the mobile device.

16. The server computer of claim 11, wherein the communications network is a wireless communications network.

17. The server computer of claim 11, wherein the transactional image layer comprises data relating to a current purchase.

18. The server computer of claim 11, wherein method further comprises:
retrieving the master image layer and the transactional image layer from the memory based on the identifier associated with the mobile device,
processing the master image layer and the transactional image layer to generate the image data, and
transmitting the image data to the mobile device.

* * * * *